(12) United States Patent
Sakurai et al.

(10) Patent No.: US 7,711,096 B2
(45) Date of Patent: May 4, 2010

(54) TELECOMMUNICATION SERVER APPARATUS

(75) Inventors: Kenichi Sakurai, Kawasaki (JP); Ryuji Fukuhara, Fukuoka (JP); Masahiko Kagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 11/329,700

(22) Filed: Jan. 11, 2006

(65) Prior Publication Data
US 2007/0081656 A1 Apr. 12, 2007

(30) Foreign Application Priority Data
Sep. 28, 2005 (JP) .............................. 2005-281106

(51) Int. Cl.
*H04M 15/00* (2006.01)
(52) U.S. Cl. ........................... 379/112.01; 379/112.05; 379/112.1
(58) Field of Classification Search ............ 379/112.01, 379/112.03–112.06, 112.1, 221.01, 221.05, 379/221.06, 221.07; 455/445, 453
See application file for complete search history.

(56) References Cited

U.S. PATENT DOCUMENTS 5,835,490 A * 11/1998 Park et al. ................... 370/342
6,160,875 A * 12/2000 Park et al. ................... 379/133
7,227,927 B1 * 6/2007 Benedyk et al. ............ 379/9.05

FOREIGN PATENT DOCUMENTS

JP 2-132575 5/1990
JP 2002-94660 A 3/2002

OTHER PUBLICATIONS

Office Action mailed by Japanese Patent Office in connection with Japanese Appln. No. 2005-281106 on Jan. 26, 2010. Partial English-language translation.

* cited by examiner

*Primary Examiner*—Quoc D Tran
(74) *Attorney, Agent, or Firm*—Fujitsu Patent Center

(57) ABSTRACT

A storage unit manages a receiving order by storing a received call processing message. A retention unit retains key information, which is included in the call processing message, and element information, which is correlated to the key information and included in the call processing message, by updating the two pieces of information for every key information at every time when receiving the call processing message. A call processing execution unit carries out a call processing for each call processing message stored by the storage unit at a predetermined time interval in a lump based on the key information and element information stored by the retention unit.

12 Claims, 16 Drawing Sheets

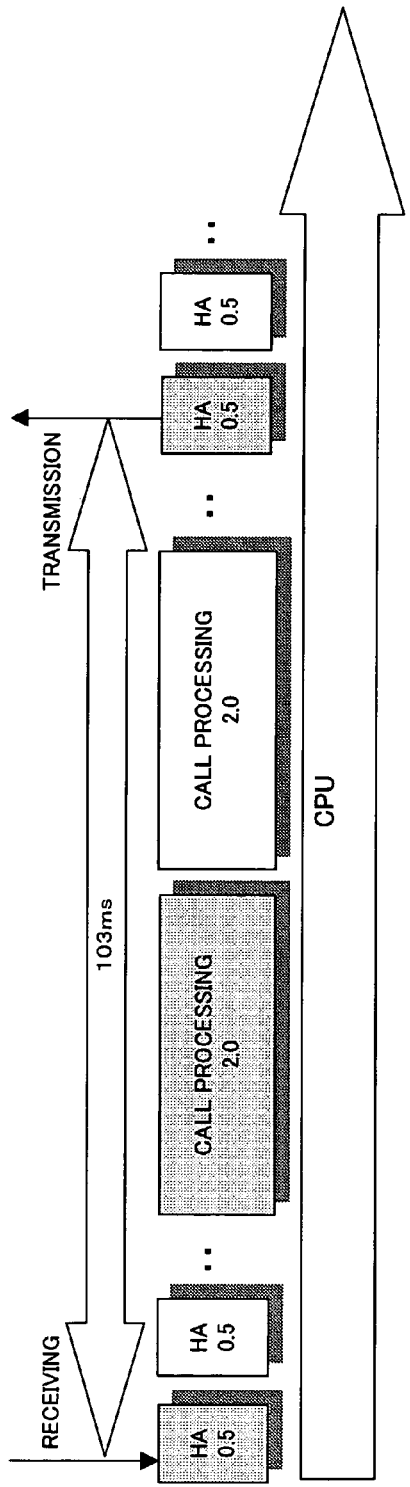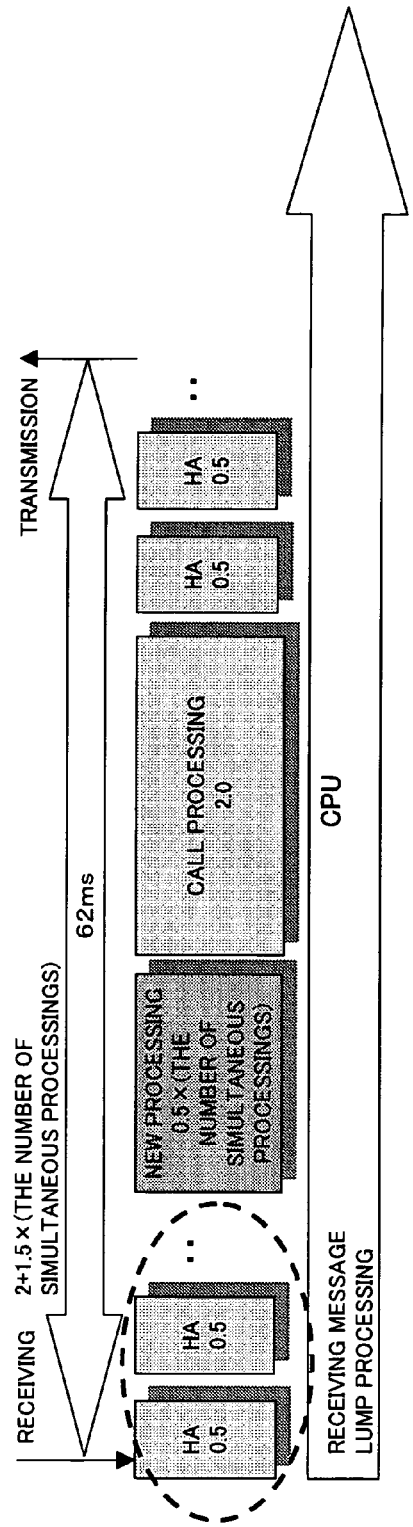
FIG. 12A PRIOR ART
FIG. 12B

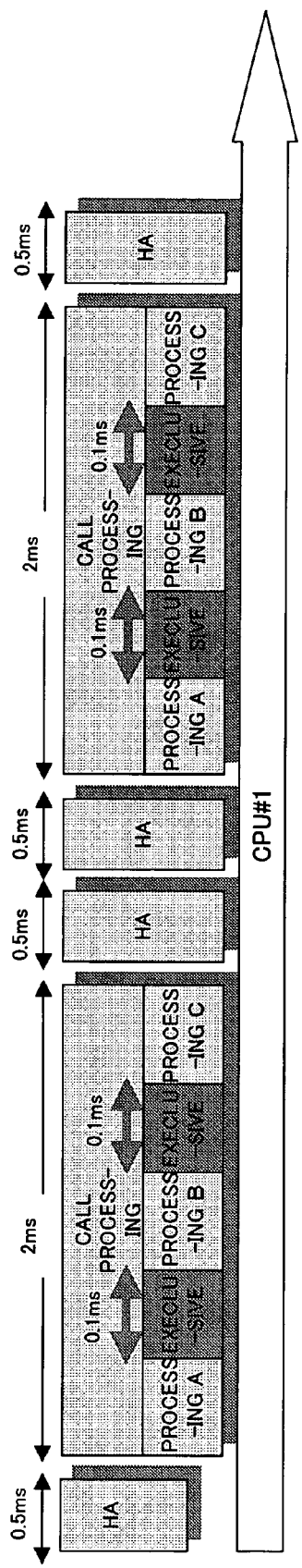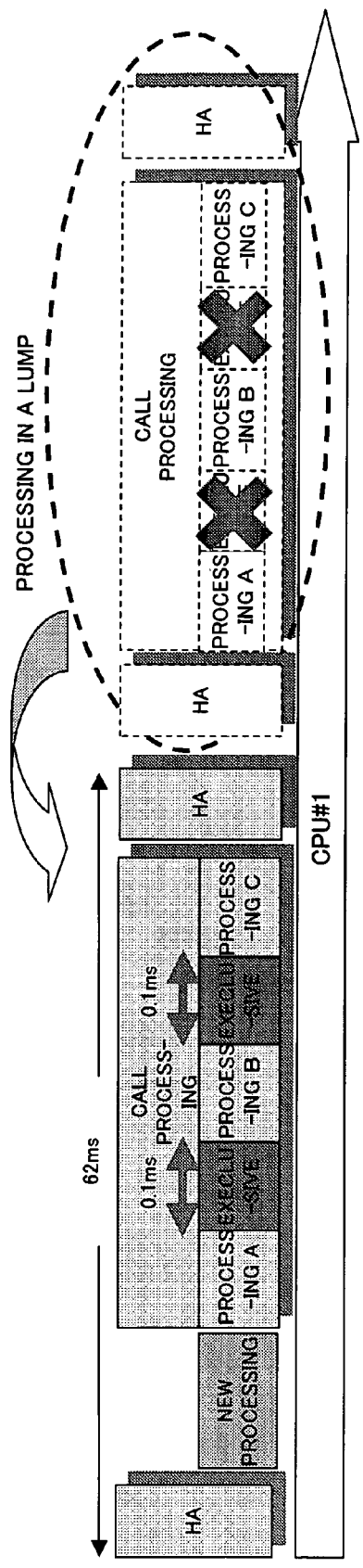
FIG. 14A PRIOR ART
FIG. 14B

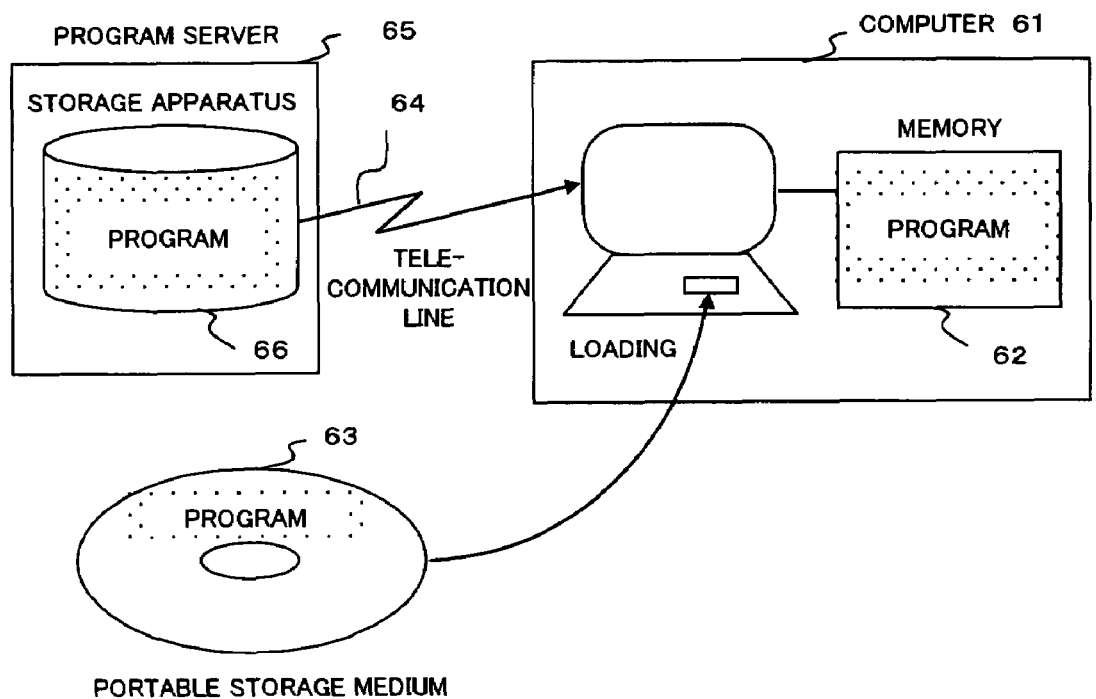
F I G. 1 6

TELECOMMUNICATION SERVER APPARATUS

BACKGROUND OF THE INVENTION

1. Field of the Invention

The present invention relates to a data exchange technique and in particular to a technique for improving a processing performance of a telecommunication server that is a computer server system for providing a telecommunication exchange function.

2. Description of the Related Art

As an example technique related the present invention, a laid-open Japanese patent application publication No. 02-132575 has disclosed an operation technique for writing information on results of parallel processings in a single address of a storage apparatus of each computer in a lump for the purpose of reducing a synchronous overhead at the time of parallel computers sharing data.

In a conventional telecommunication server for providing the so called IP (Internet Protocol) telephone service, a processing has been carried out in sequence by corresponding to receiving every call processing message according to a call control protocol such as an SIP (session initiation protocol). This can cause a problem in the telecommunication if a great many number of call control messages are received from customer terminals in a short time period, thus exceeding the process capability and possibly ill-affecting calls.

In a telecommunication server, a high level processing such as a control processing for a message transmission and receiving shown as "HA" in FIG. 1 is carried out in higher priority than a call processing that is a low level processing. Therefore, a required processing time of a call processing, which has been completed in three milliseconds from a receiving of a call processing message to a response back to the aforementioned message as exemplified by FIG. 1(a) at the time of a low processing load, results in taking four milliseconds as exemplified by FIG. 1(b) at the time of a high processing load in a telecommunication server made up of a computer system with one CPU (central processing unit). While a degree of such extension of a processing time varies with a configuration of a used computer system and a processing content, extension of a processing time (i.e., saturation in the number of processible calls per unit of time) is observed remarkably when a processing load exceeding approximately 70% of CPU usage ratio is given in a measurement example shown by FIG. 2. Note that the BHCA shown by FIG. 2 is defined as the number of processible busy hour call attempts.

Here, there is a method for responding to such a high processing load by using a multi-CPU system as a computer system utilized as a telecommunication server. However, an update processing of various kinds of information which are stored by a storage apparatus such as a memory or data base as one of the call processings requires an exclusive processing, that is, an independent processing by temporarily stopping other processings being carried out in parallel on the telecommunication server as a call processing in order to prevent an inconsistency of data from occurring. This ends up limiting an effectiveness of improving a process capability as a telecommunication server even if the process capability of the computer system is improved as a multi-CPU system.

Let it describe FIG. 3 which shows a summary flow of a control processing carried out by a telecommunication server by way of a flow chart. Referring to FIG. 3, the processings of S1002, S1003 and S1007 correspond to the transmission & receiving control processing shown as "HA" by FIG. 1, and those of S1004 through S1006 correspond to call processings.

First in S1001, carried out is the processing of receiving a transmitted signal (i.e., a call processing message) and inputting it into a receiving queue by the OS (operating system) of the computer. Here, in S1002, carried out is the processing, as a transmission & receiving control process, of checking the receiving queue at a predetermined interval and taking received signals in one by one existing in the receiving queue. In the subsequent S1003, carried out is the processing of handing an applicable received signal over to a call processing if receiving of a signal is confirmed by taking in the received signal.

In the call processing, first in S1004, carried out is a signal analysis processing. That is, the processing of analyzing the content of the received signal that has been received, e.g., identifying a category of the received message such as a login request, call start request, et cetera. In the analysis processing, carried out is the processing of writing the content of the received signal, e.g., information indicating the transmitter of the received signal, information indicating a state of the transmitter, in the storage apparatus such as a memory or data base, if the currently received signal is legitimate.

In S1005, carried out is a routing processing, that is, of referring to the routing data in the storage apparatus, followed by determining a suitable transmission destination in order to deliver the content of the aforementioned received signal to the addressee indicated thereby that has been received.

In S1006, carried out is a transmission processing, that is, of making a transmission signal (i.e., a response signal corresponding to the received signal) based on the content of the received signal being written in the storage apparatus, followed by requesting the transmission & receiving control process for transmitting the made transmission signal by handing it over to the aforementioned process.

In S1007 over at the transmission & receiving control process, carried out is the processing of inputting the received transmission signal into a transmission queue.

In S1008, carried out is the processing of transmitting the transmission signal existing in the transmission queue to the addressee determined by the above described routing processing by the OS of the computer system.

A telecommunication server carries out the above described control processing.

Among the control processing, as the call processing from S1004 through to S1006 can be divided into a plurality of threads, enabling a multi-thread processing by a multi-CPU computer system. The signal analysis processing in S1004, however, requires an exclusive processing since the processing includes the processing of writing, in a storage apparatus, the content of the received signal that has been received.

FIGS. 4A and 4B illustrates how processings progress when making computer systems with different numbers of CPUs carry out the above described control processing which is carried out by a telecommunication server, with FIG. 4A showing the case of one CPU, while FIG. 4B showing the case of two CPUs, respectively. As is understood by comparing between FIG. 4A and FIG. 4B, the process capability of the above described control processing even does not simply become twice if the number of CPUs is duplicated, resulting in extending the processing time of a part of processing of the call processing. This is caused by the reason for carrying out an exclusive control for the second CPU resulting in having it stop executing the primary processing during the period of the first CPU carrying out a write processing.

FIG. 5 shows an actual measurement example of the relationship between the number of CPUs of a computer system for use as a telecommunication server and the number of call processings. In the example shown by FIG. 5, an increase in the number of call processings is saturated in the neighborhood of 300 thousand BHCAs even by increasing the number of CPUs, with the case of four CPUs the number of processings decreasing as compared to the case of three CPUs because the influence of execution stoppage of other processings due to an exclusive processing becomes larger with four CPUs than with three CPUs.

SUMMARY OF THE INVENTION

The purpose of the present invention is to increase the processing number of call processings by a telecommunication server in a unit of time.

As one of aspects of the present invention, a telecommunication server apparatus, as the one for providing a telecommunication exchange function, comprises: a storage unit for managing a receiving order by storing a received call processing message; a retention unit for retaining key information, which is included in the call processing message, and element information, which is correlated to the key information and included in the call processing message, by updating the two pieces of information for every aforementioned key information at every time when receiving the call processing message; and a call processing execution unit for carrying out a call processing for each call processing message stored by the storage unit at a predetermined time interval in a lump based on the key information and element information stored by the retention unit.

According to the above described telecommunication server apparatus, the number of executing the processing of writing key information and element information which require an exclusive control in a call processing is reduced as compared to the conventional case of carrying out at every time when receiving a call processing message, hence increasing the number of processible call processings in a unit of time.

Meanwhile, the above described telecommunication server apparatus according to the present invention may be configured such that the aforementioned key information is information for indicating a transmitter of a call processing message which has included the key information, and the aforementioned element information is information for indicating a state of the aforementioned transmitter.

The above described telecommunication server apparatus according to the present invention may be configured to further include a judgment unit for judging a size of a load for providing a telecommunication exchange function by the telecommunication server apparatus, wherein the call processing execution unit carries out the call processing in a lump at a predetermined time interval if the judgment unit judges that a load for providing the telecommunication exchange function is large, while carries out a call processing for the call processing message immediately at every time when the call message is received if the judgment unit judges that the load is small.

And in this case the configuration may be such that the judgment unit judges a size of load of the processing based on a usage ratio of a processing apparatus which functions as the call processing execution unit.

This configuration is capable of providing the same processing as the conventional technique by putting emphasis on an immediate processing in the case of small processing load, while a high process capacity in the case of a large processing load.

BRIEF DESCRIPTION OF THE DRAWINGS

The present invention will be more apparent from the following detailed description when the accompanying drawings are referenced.

FIG. 12A illustrates an estimation example of a call processing capacity of a conventional telecommunication server using a computer system with one CPU;

FIG. 12B illustrates an estimation example of a call processing capacity of a telecommunication server embodying the present invention using a computer system with one CPU;

FIG. 14A illustrates an estimation example of a call processing capacity per CPU of a conventional telecommunication server using a computer system comprising two CPUs;

FIG. 14B illustrates an estimation example of a call processing capacity per CPU of a telecommunication server embodying the present invention using a computer system comprising two CPUs;

FIG. 16 shows an example of a storage medium allowing a computer to read a stored program.

DESCRIPTION OF THE PREFERRED EMBODIMENTS

The following is a detailed description of the preferred embodiment of the present invention while referring to the accompanying drawings.

Figure 6:
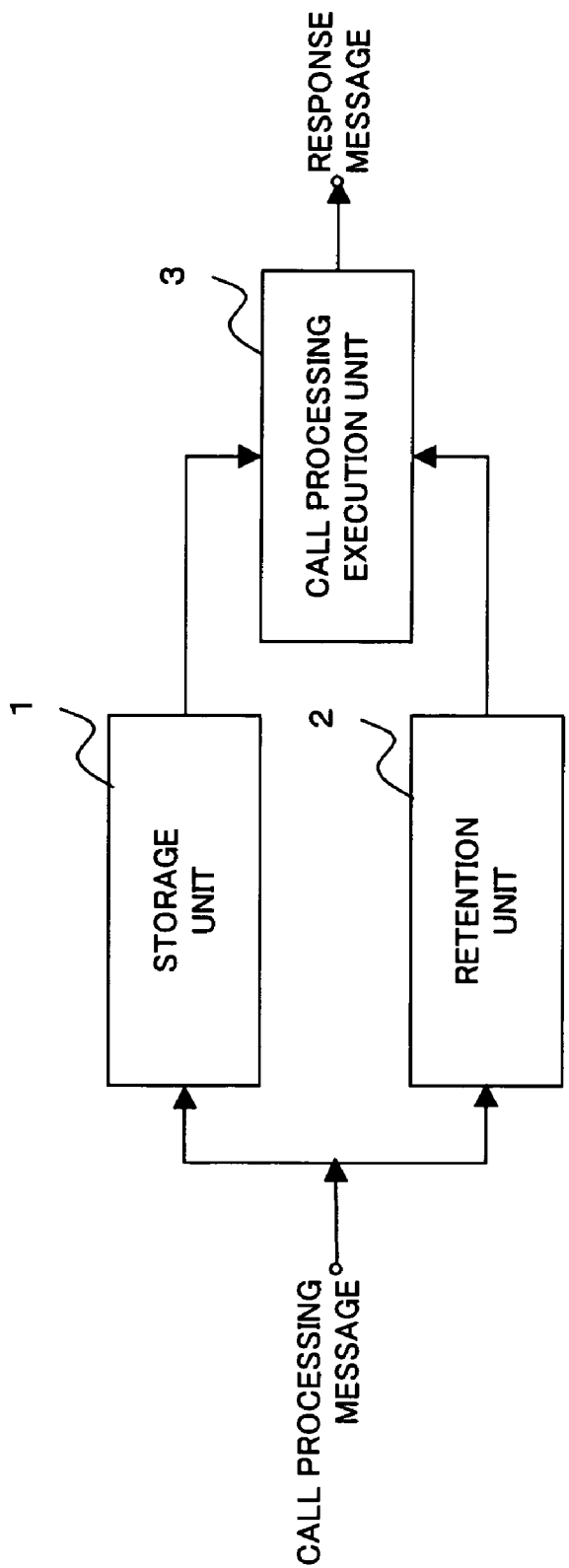
FIG. 6 shows a basic comprisal of a telecommunication server apparatus embodying the present invention.

The first description deals with FIG. 6 which shows a basic comprisal of a telecommunication server apparatus embodying the present invention. The telecommunication server apparatus is for providing a telecommunication exchange function.

Referring to FIG. 6, a storage unit 1 manages a receiving order by storing a received call processing message.

A retention unit 2 retains key information, which is included in the call processing message, and element information, which is correlated to the aforementioned key information and included in the aforementioned call processing message, by updating the aforementioned two pieces of information for every aforementioned key information at every time when receiving the aforementioned call processing message.

A call processing execution unit 3 carries out a call processing for each call processing message stored by the storage unit 1 at a predetermined time interval in a lump based on the key information and element information stored by the retention unit 2.

According to the above described telecommunication server apparatus, the number of executing the processing of writing key information and element information which require an exclusive control in a call processing is reduced as compared to the conventional case of carrying out at every time when receiving a call processing message, hence increasing the number of processible call processings in a unit of time.

Meanwhile, the above described telecommunication server apparatus may be configured such that the key information is information for indicating a transmitter of a call processing message which has included the aforementioned key information, and the element information is information for indicating a state of the aforementioned transmitter.

The above described telecommunication server apparatus may be configured to further include a judgment unit for judging a size of a load for providing a telecommunication exchange function by the aforementioned telecommunication server apparatus, wherein the call processing execution unit 3 carries out the aforementioned call processing in a lump at a predetermined time interval if the aforementioned judgment unit judges that a load for the aforementioned processing is large, while carries out a call processing for the aforementioned call processing message immediately at every time when the aforementioned call message is received if the aforementioned judgment unit judges that the aforementioned load is small.

And in this case the configuration may be such that the judgment unit judges a size of a load of the aforementioned processing based on a usage ratio of a processing apparatus which functions as the call processing execution unit.

This configuration is capable of providing the same processing as the conventional technique by putting emphasis on an immediate processing in the case of a small processing load, while a high process capacity in the case of a large processing load.

By the above described comprisal, the telecommunication server apparatus embodying the present invention increases the number of processing call processings carried out thereby in the unit of time.

Figure 7:
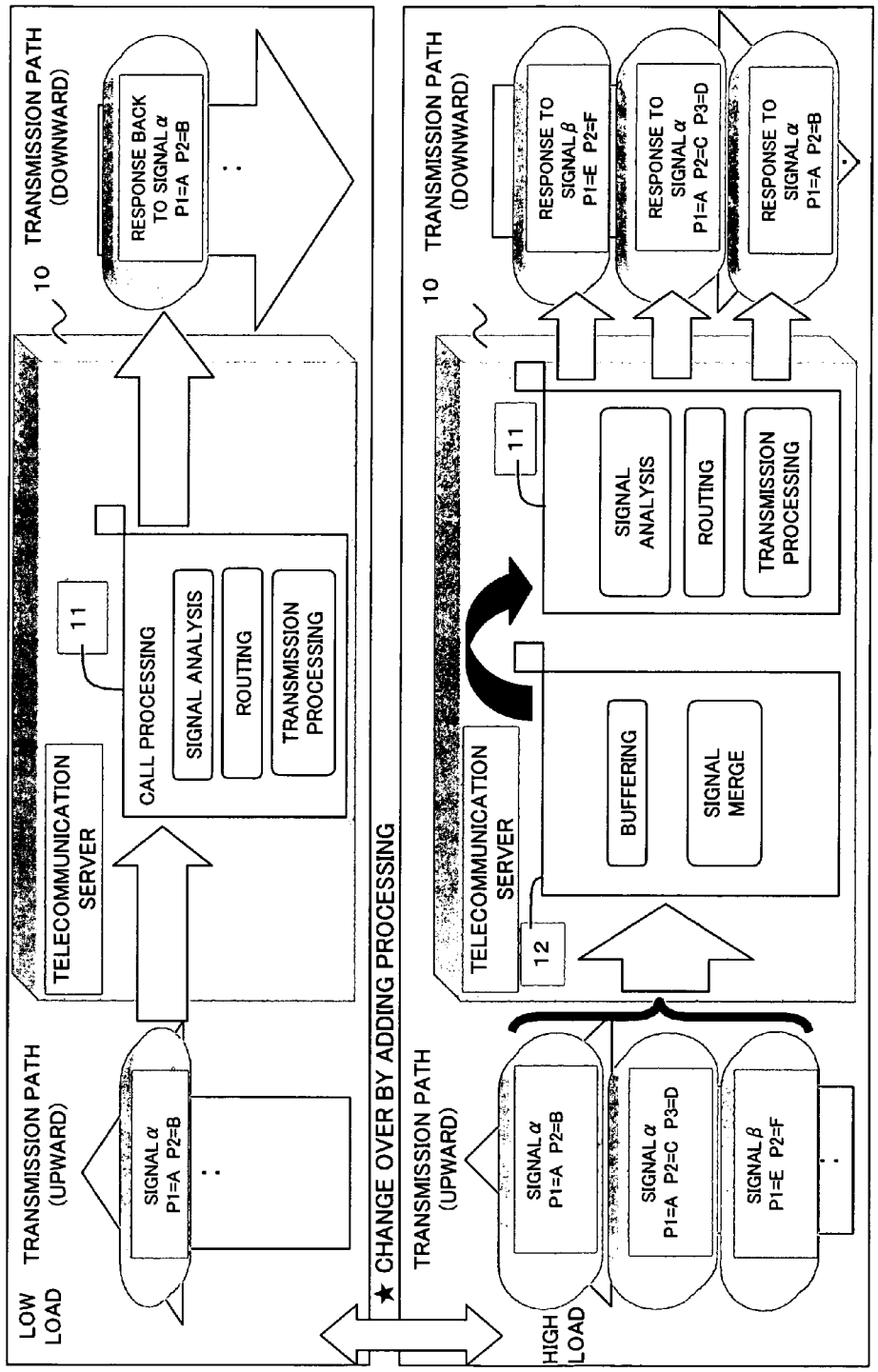
FIG. 7 shows an operating principle of a telecommunication server embodying the present invention.

The next description deals with the operating principle of a telecommunication server embodying the present invention while referring to FIG. 7.

The telecommunication server 10 judges a size of a processing load in a call processing carried out by the own apparatus and changes over the processing methods according to the judgment result. Here, if the judgment is a small processing load, the telecommunication server 10 carries out a call processing 11 immediately at every time of receiving a signal (i.e., a call processing message) from the upward transmission path for transmitting a response signal responding to the received signal to the downward transmission path as shown by the processing flow on the upper side of FIG. 7. On the other hand, if the judgment is a large processing load, the telecommunication server 10 carries out a new processing 12 for a received signal from the upward transmission path, a buffering of the received signal and a merging of the aforementioned signal according to the content of the signal followed by carrying out a call processing 11 in a lump as shown by the processing flow on the lower side of FIG. 7.

Figure 8:
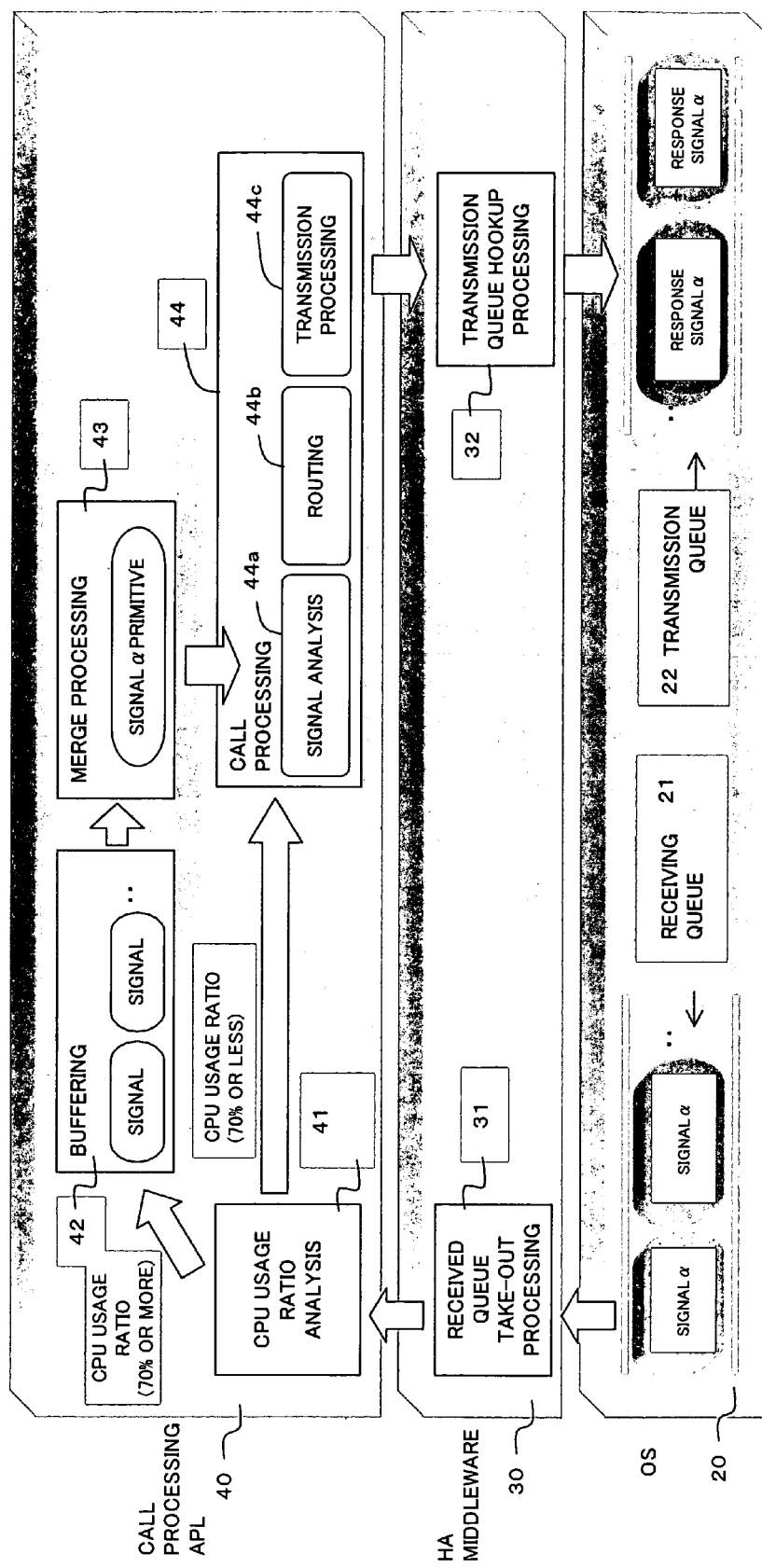
FIG. 8 shows a functional block diagram of a telecommunication server embodying the present invention.

The next description deals with FIG. 8 which shows a functional block diagram of a telecommunication server embodying the present invention. The CPU comprised by a computer system functioning as telecommunication server executes an OS 20, an HA middleware 30 and a call processing APL (application program) 40.

First, carried out is the processing of inputting a transmitted signal (i.e., a call processing message) in a receiving queue 21 by receiving it by executing the OS. Here, execution of the HA middleware 30 carries out a received queue take-out processing 31, i.e., the processing is for checking the receiving queue 21 at a predetermined time interval, taking received signals existing therein one by one and hand it over to the call processing APL 40.

As the call processing APL 40 is executed, carried out first is the processing 41 for analyzing a usage ratio of the CPU of the computer system and judging a degree of the usage ratio. In this analysis processing 41, if the CPU usage ratio is low (e.g., 70% or less), a call processing 44 is carried out immediately. On the other hand, if the CPU usage ratio is high (e.g., 70% or more), a buffering processing 42 and merge processing 43 are carried out followed by carrying out a call processing. Note that the judgment for carrying out the buffering processing 42 and merge processing 43 may be made based on the receiving number of received signals in a unit of time in lieu of the CPU usage ratio.

Figure 3:
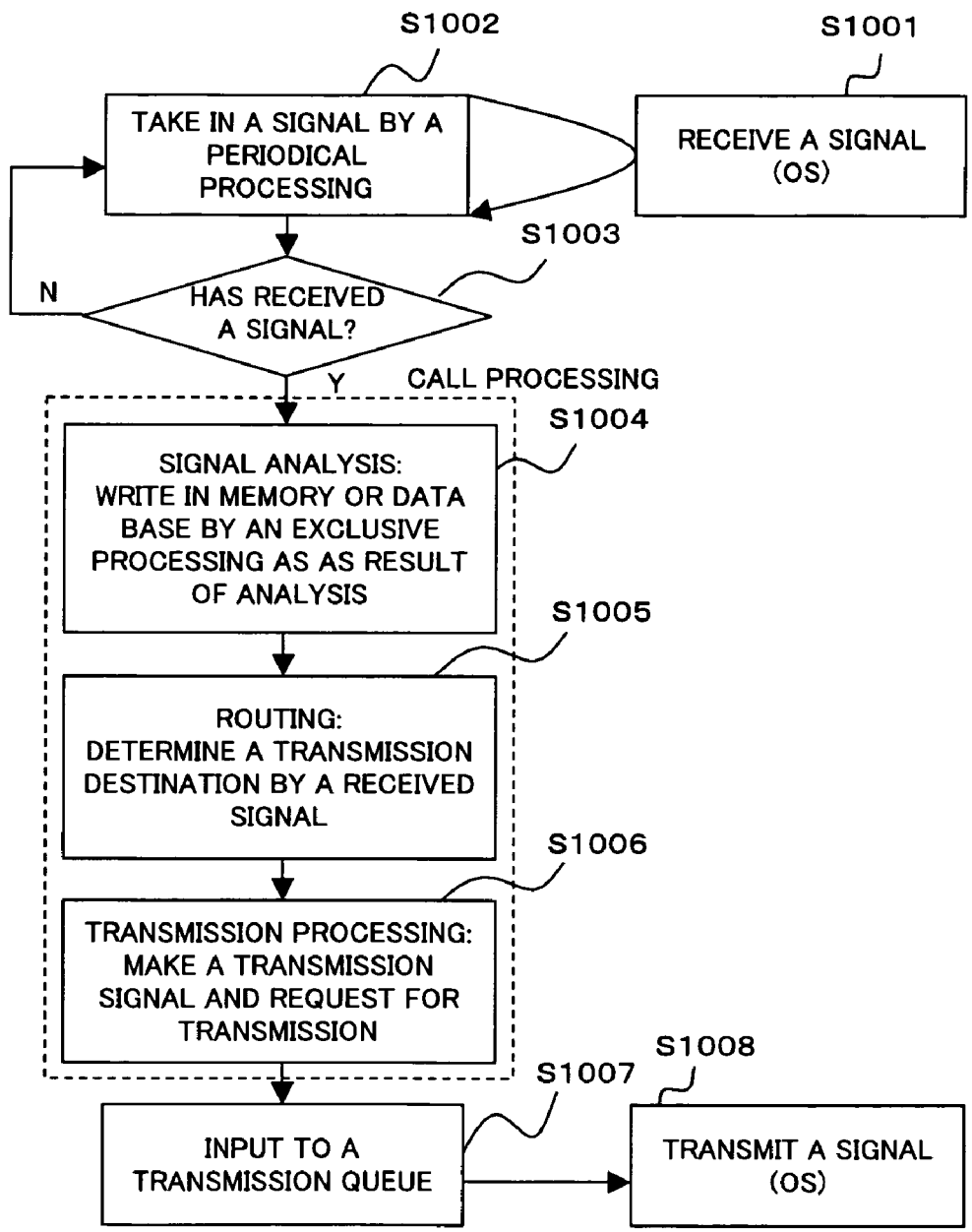
FIG. 3 shows a summary flow of a control processing carried out by a telecommunication server by a flow chart.
Figure 4A:
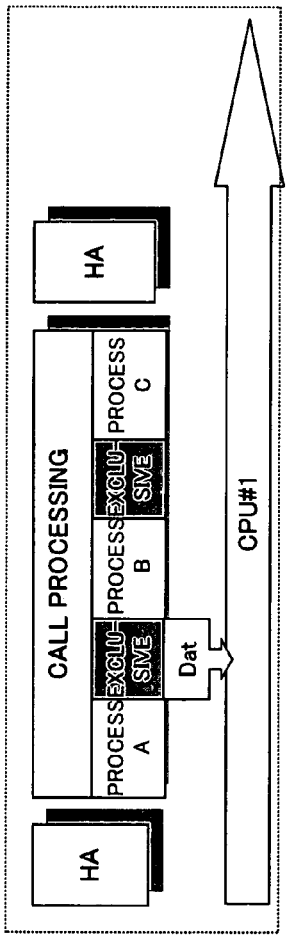
FIG. 4A illustrates how a process progresses in the case of making a computer system with one CPU execute a control processing carried out by a telecommunication server.
Figure 4B:
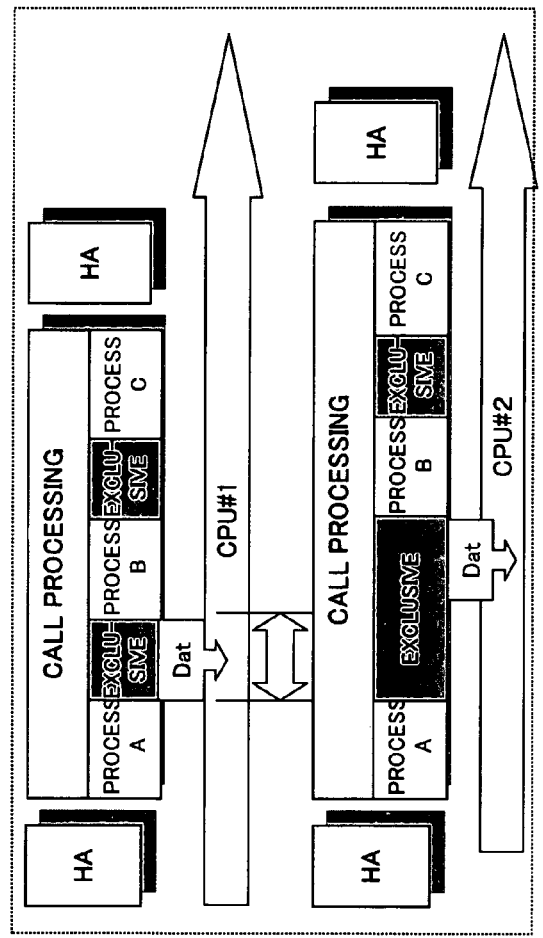
FIG. 4B illustrates how a process progresses in the case of making a computer system with two CPU execute a control processing carried out by a telecommunication server.

The call processing 44 carries out a signal analysis processing 44a, routing processing 44b and transmission processing 44c which are the same as the processings in S1004 through S1006 shown by FIG. 3, and a transmission signal is generated as a result of carrying out the aforementioned processings.

As the transmission signal is generated, an execution of the HA middleware 30 carries out a transmission queue hookup processing 32, that is, the processing of inputting the transmission signal into a transmission queue 22.

Then an execution of the OS 20 carries out the processing of transmitting the transmission signal existing in the transmission queue 22 to a transmission destination determined by the routing processing 44b.

Figure 9:
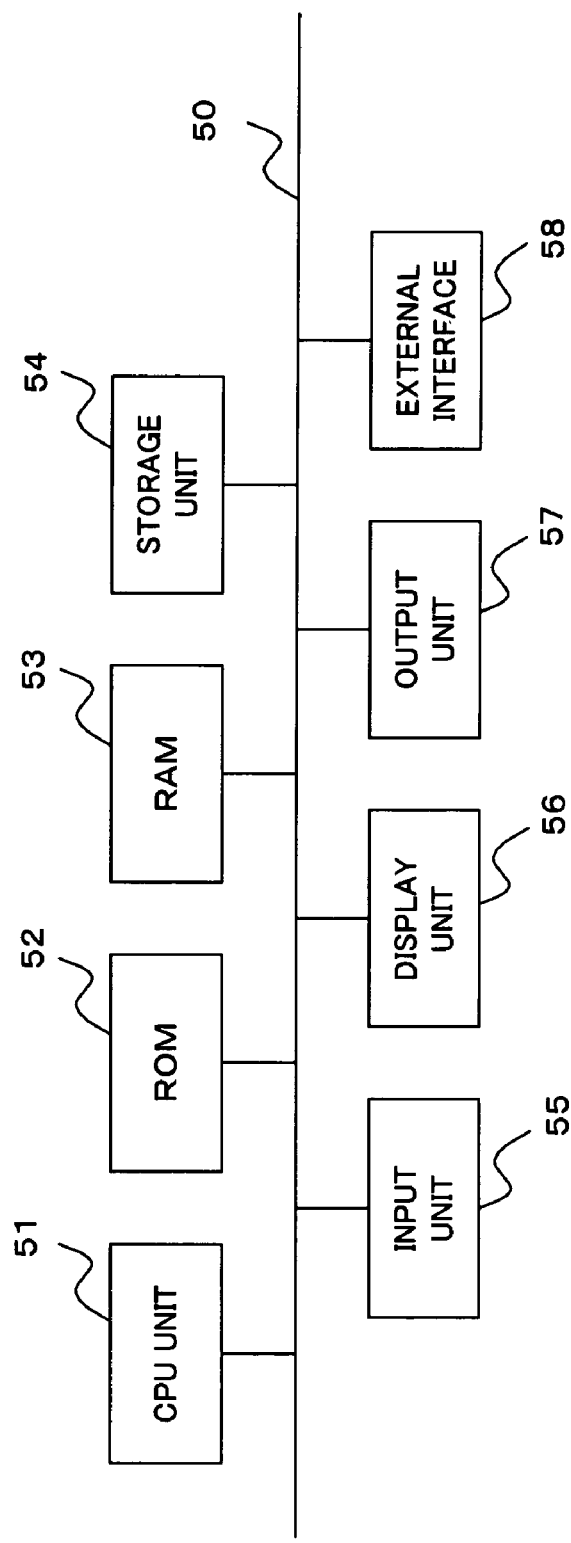
FIG. 9 shows a hardware configuration of a computer system functioning as telecommunication server embodying the present invention.

The next description deals with FIG. 9 which shows a hardware configuration of a computer system functioning as telecommunication server embodying the present invention.

The computer system shown by FIG. 9 comprises a CPU unit 51, a ROM 52, a RAM 53, a storage unit 54, an input unit 55, a display unit 56, an output unit 57, an external interface 58, and a bus 50 interconnecting the aforementioned components which are capable of data exchanges with one another under the management of the CPU unit 51.

The CPU (central processing unit) unit 51 is one or plurality of central processing apparatuses for managing an operation control of the entirety of the computer system and carrying out various processings including the call processing. The ROM (read only memory) 52 is a memory for storing a basic control program executed by the CPU unit 51. The CPU unit 51 executing the basic control program at starting the computer system carries out the basic control of operations of the entire computer system.

The RAM (random access memory) 53 is a memory used as a work memory when the CPU unit 51 executes various control programs and as a main memory used as temporary storage area for various data on as required basis.

The storage unit 54, comprising an HDD (hard disk drive) for example, stores a control program for making the CPU unit 51 execute various control processings carried out by the computer system.

The input unit 55 is for receiving an external input and handing the content of the input over to the CPU unit 51 by comprising input apparatuses, such as a key board, mouse, et cetera, for receiving an instruction of the operator of the computer system. The input unit 55 also comprises on as required basis a readout apparatus for reading data out of a portable storage medium such as FD (flexible disk), CD-ROM (compact disk ROM), DVD-ROM (digital versatile disk-ROM), MO (magneto-optical) disk, et cetera.

The display unit 56 is for displaying various pieces of information according to an instruction from the CPU unit 51, comprising a CRT (cathode ray tube) or LCD (liquid crystal display) for example.

The output unit 57 is for outputting various pieces of information according to an instruction from the CPU unit 51, comprising such as a printer apparatus for printing a display content of the display unit 56 onto a piece of paper as is.

The external interface 58 is for performing a telecommunication management at the time of signal exchange with other equipments by connecting the computer system to a transmission path.

As described above the computer system shown by FIG. 9 comprises commonly as does a computer system having a standard hardware configuration.

Figure 10:
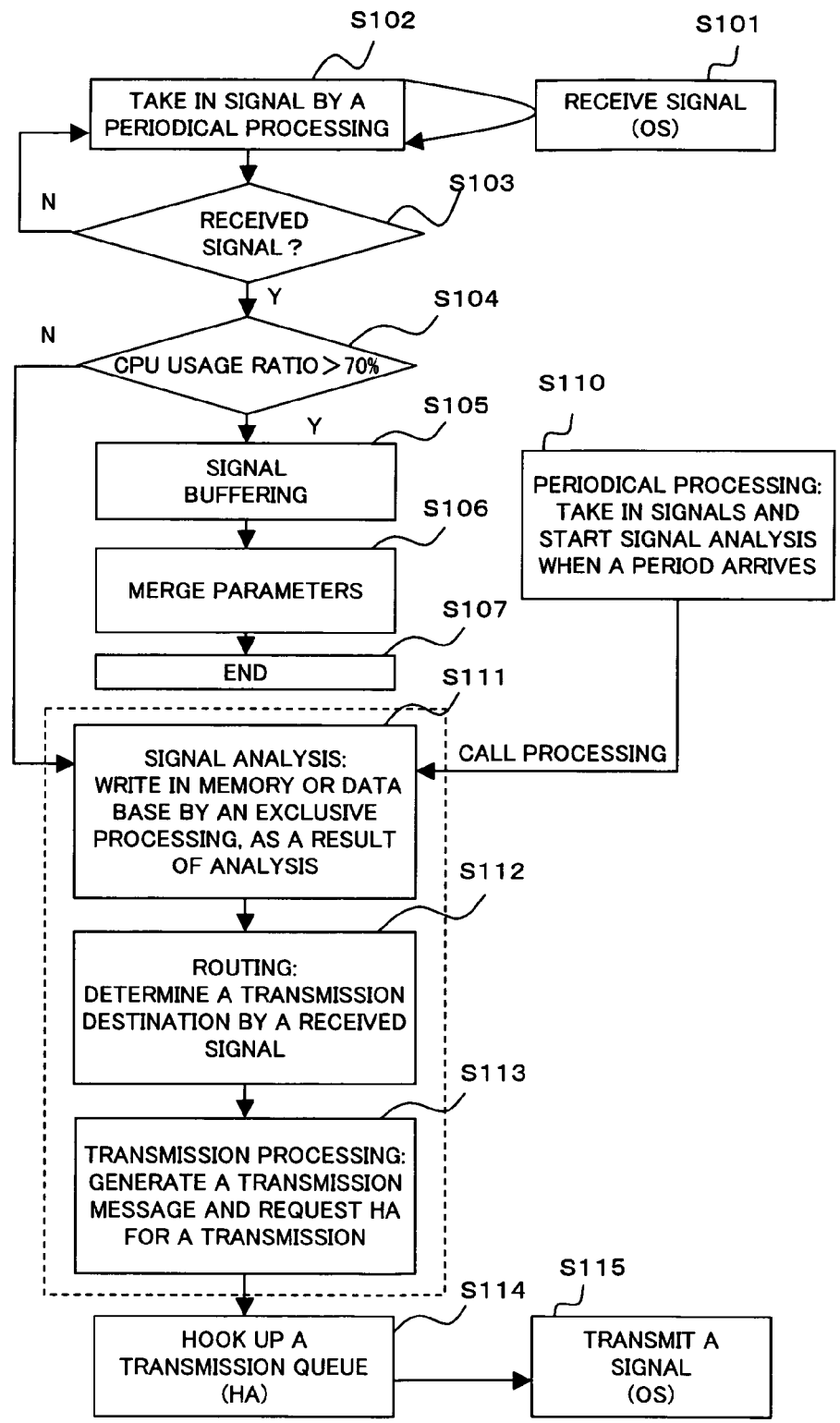
FIG. 10 shows a flow chart of a control processing flow carried out by a telecommunication server embodying the present invention.

The next description deals with FIG. 10 which shows a flow chart of a control processing flow carried out by a telecommunication server embodying the present invention. Note that the processing are accomplished by the CPU unit 51 reading out various programs stored by the storage unit 54 and executing it in the computer system shown by FIG. 9.

Referring to FIG. 10, the processings of S101 and S115 are carried out by an execution of the OS 20 shown by FIG. 8, while the processings of S103, S103 and S114 are carried out by executing the HA middleware 30. And the processings of S104 through 106, and S110 through S113, are carried out by executing the call processing APL 40 shown by FIG. 8.

First in S101, carried out is the processing of receiving a transmitted signal (i.e., a call processing message) and inputting it into the receiving queue. Here in S102, carried out is the processings of checking the receiving queue in a predetermined time interval and taking in the received signals existing therein in a lump, followed by carrying out, in the subsequent S103, the processing of handing the received signals over to the call processing APL 40 if a receiving of signal is confirmed as a result of taking in the received signals.

Over at the call processing APL 40, first in S104, carried out is the processing of analyzing a CPU usage ratio to judge the level thereof. Here, if the CPU usage ratio is judged to be low (i.e., 70% or less, in the case of FIG. 10), carried out are the equivalent processing as the call processing 44 shown by FIG. 8, that is, a signal analysis processing in S111, a routing processing in S112 and a transmission processing in S113. As a transmission signal is generated, then in S114, carried out is a transmission queue hookup processing, that is, the processing of inputting the transmission signal into the transmission queue, followed by, in S115, the processing of transmitting the received signal existing in the transmission queue to a transmission destination determined by the above described routing processing of S112.

On the other hand, if the CPU usage ratio has been judged to be high (i.e., 70% or more, in the case of FIG. 10) in S104, then carried out are the buffering processing of S105 and the parameter merge processing of S106 to end the process once. In the meantime, a periodical processing of S110 is carried out in a predetermined time interval, e.g., the same time interval as an execution interval of the take-in processing of the received signal of S102. Then, the signal analysis processing of S111, which is the first process of a call processing, is started to carry out a signal analysis for the received signals, in a lump, which have been processed by the buffering and merging. This is followed by processings from S112 through to S115.

Figure 11:
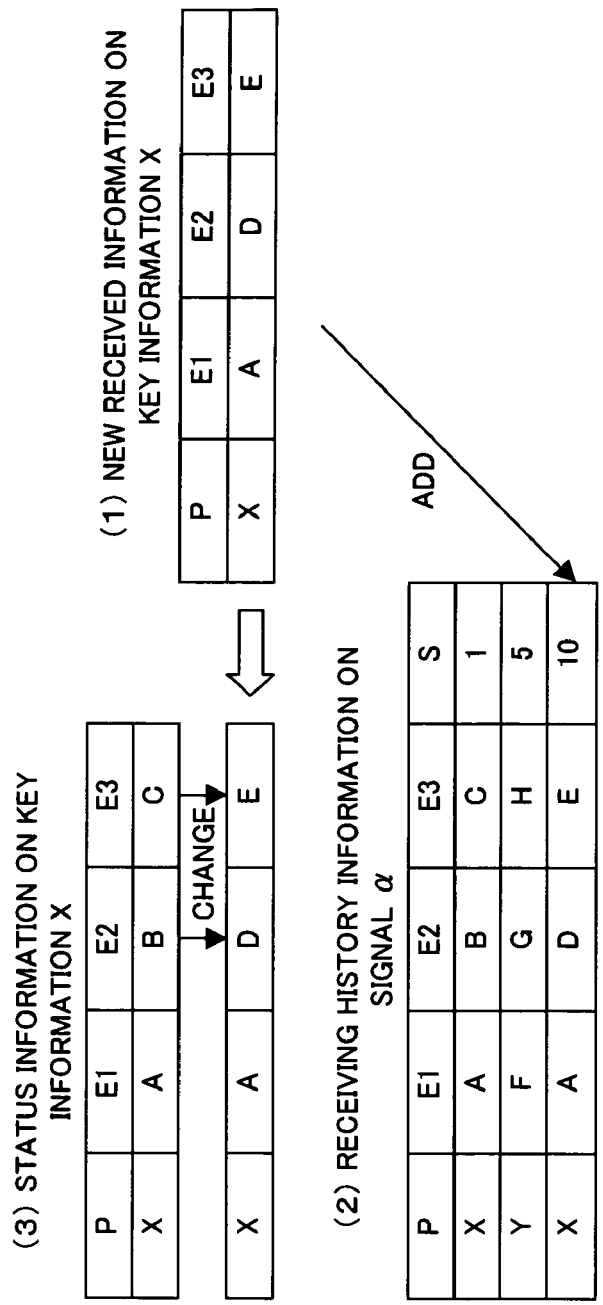
FIG. 11 shows how history data of received signals and status information are made.

The next description deals with the details of the buffering processing of S105 and the parameter merge processing of S106 while referring to FIG. 11 shows how history data of received signals α and status information are made. Here, let it define that a received signal α has for example key information P for indicating the transmitter, and element information (i.e., parameter) which is made up of three elements E1, E2 and E3 as information correlated with the key information P (e.g., information for indicating a state of the transmitter which is expressed by the key information P).

Now, assuming that a signal α is received anew, the content of the signal α is "X" for the key information P; and are "A", "D" and "E" for the element information E1, E2 and E3, respectively, as shown by FIG. 11-(1).

Also let it assume that the telecommunication server has already received a total of nine signals including the number of other kinds of signals (e.g., signals β, γ, et cetera) at the time of receiving the signal α anew. In this event, the telecommunication server assigns the number "10" as a sequence number S to the newly received signal α in order to manage a sequence of receiving, followed by adding the contents of the newly received signal α (i.e., key information and element information) in the receiving history information table with regard to the signal α as shown by FIG. 11 (2). This processing is the buffering processing in S105 shown by 10. Note that the receiving history information table is stored by a storage apparatus (such as a memory) comprised by a telecommunication server.

Furthermore, having received a signal α anew, the telecommunication server retains, in a storage apparatus (such as a memory), by updating to the latest content as shown by FIG. 11 (3), element information E1, E2 and E3 whose key information P is "X" in a signal α which has been received immediately prior to the time. This processing is the merge processing shown by S106 in FIG. 10.

When the signal analysis processing of S111 as the first processing of the call processing is started by the periodical processing of S110 shown by FIG. 10, carried out is the processing of writing, in a storage apparatus, element information for every piece of key information which is updated and retained as described above. As described before, the writing processing needs to be carried out along with an exclusive control. However, a merge processing is carried out when a CPU usage ratio is high and a writing processing is carried out only for the latest status information updated by the merge processing according to the processing shown by FIG. 10. Therefore, the number of write processings, that is, the number of exclusive processings, is reduced as compared to the case of carrying out a write processing relating to status information on all the received signals. As a result, the number of call processings that are processed in a unit of time increases because other thread processing can be carried out as many as the reduced number of the aforementioned write processings.

The next description deals with an effect of an improved call process capability of a telecommunication server by embodying the above described present invention.

FIGS. 12A and 12B illustrates an estimation example of a call processing capacity of a computer system with one CPU telecommunication used as a telecommunication server. Note that the assumption is a case of receiving call processing messages as the subject of processing in 2.5 millisecond intervals for the description of FIGS. 12A and 12B. Also assumed here are that a transmission & receiving control processing by the HA middleware takes a processing time of 0.5 milliseconds for each message and a call processing requires a processing time of 2 milliseconds.

FIG. 12A shows the case of a conventional telecommunication server in which case the inherent processing time for a call processing message as the subject of processing is the total of the processing time for a receiving control processing (i.e., 0.5 milliseconds; simply "ms" hereinafter), that for a call processing (i.e., 2 ms.) and that for a transmission control processing (i.e., 0.5 ms), that is, 3 ms. Because an ensuing call processing message is received rather than a transmission of the transmission signal corresponding to the aforementioned call processing message, however, the receiving control processing (i.e., 0.5 ms) and call processing (i.e., 2 ms) for the aforementioned ensuing call processing message take priority. This continues until the capacity of a transmission queue, which takes in a transmission signal generated as a result of processing a call processing, becomes full. For instance, if the capacity of the transmission queue is prepared for forty messages, the required time from receiving a call processing message as the subject of processing to transmitting a corresponding transmission signal becomes 3 ms+(0.5 ms+2 ms)×40=103 ms. In this case, the number of processible call processing messages per 100 ms is limited to 38, hence corresponding to 190 thousand BHCAs when converting to the unit of BHCAs. Note that this value indicates that the processed volume of call processings does not satisfy the receiving volume of call processing messages (i.e., 40 messages per 100 ms).

In the meantime, FIG. 12B shows the case of a telecommunication server according to the present embodiment of the present invention. In this case, a buffering processing and merge processing, as new processings, are carried out for a call processing message. Note that, here, the assumption for this case is that forty (40) call processing messages in a lump are processed as the new processing which requires a processing time of 0.5 ms.

In this case, a receiving control processing (i.e., 0.5 ms), the above described new processing (i.e., 0.5 ms) and a transmission control processing (0.5 ms) are individually carried out, while a call processing (i.e., 2 ms) is processed just once in a lump, for forty call processing messages. Therefore, the required time from receiving a call processing message as the subject of processing to transmitting a corresponding transmission signal becomes 0.5 ms×3×40+2 ms=62 ms. This is equivalent to sixty four (64) messages when converting the aforementioned number to the number of processible call processing messages per 100 ms, hence equivalent to 330 thousand BHCAs when converting to the unit of BHCAs.

Figure 1:
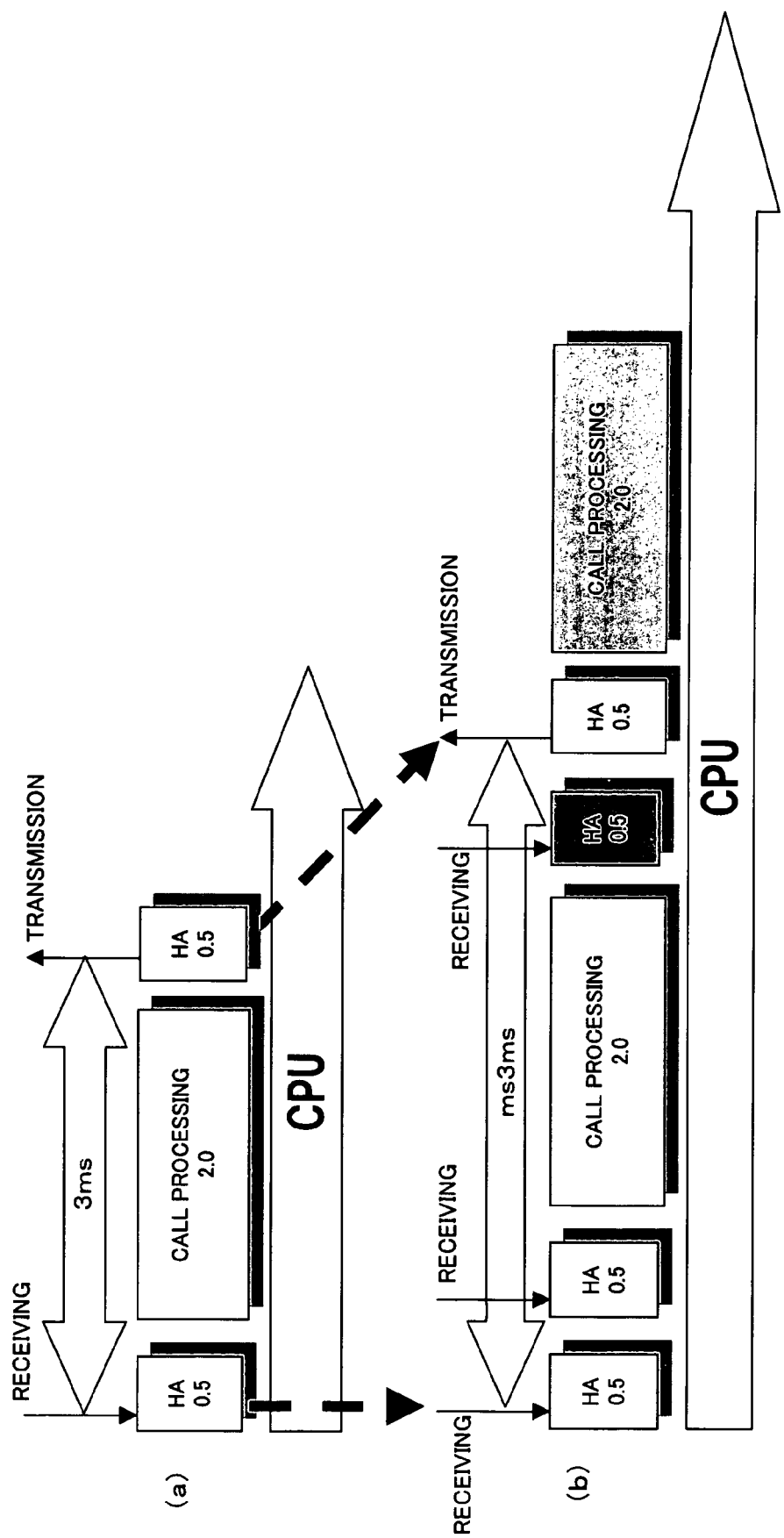
FIG. 1 describes an extension of a processing time for a call processing when a processing load is high.
Figure 2:
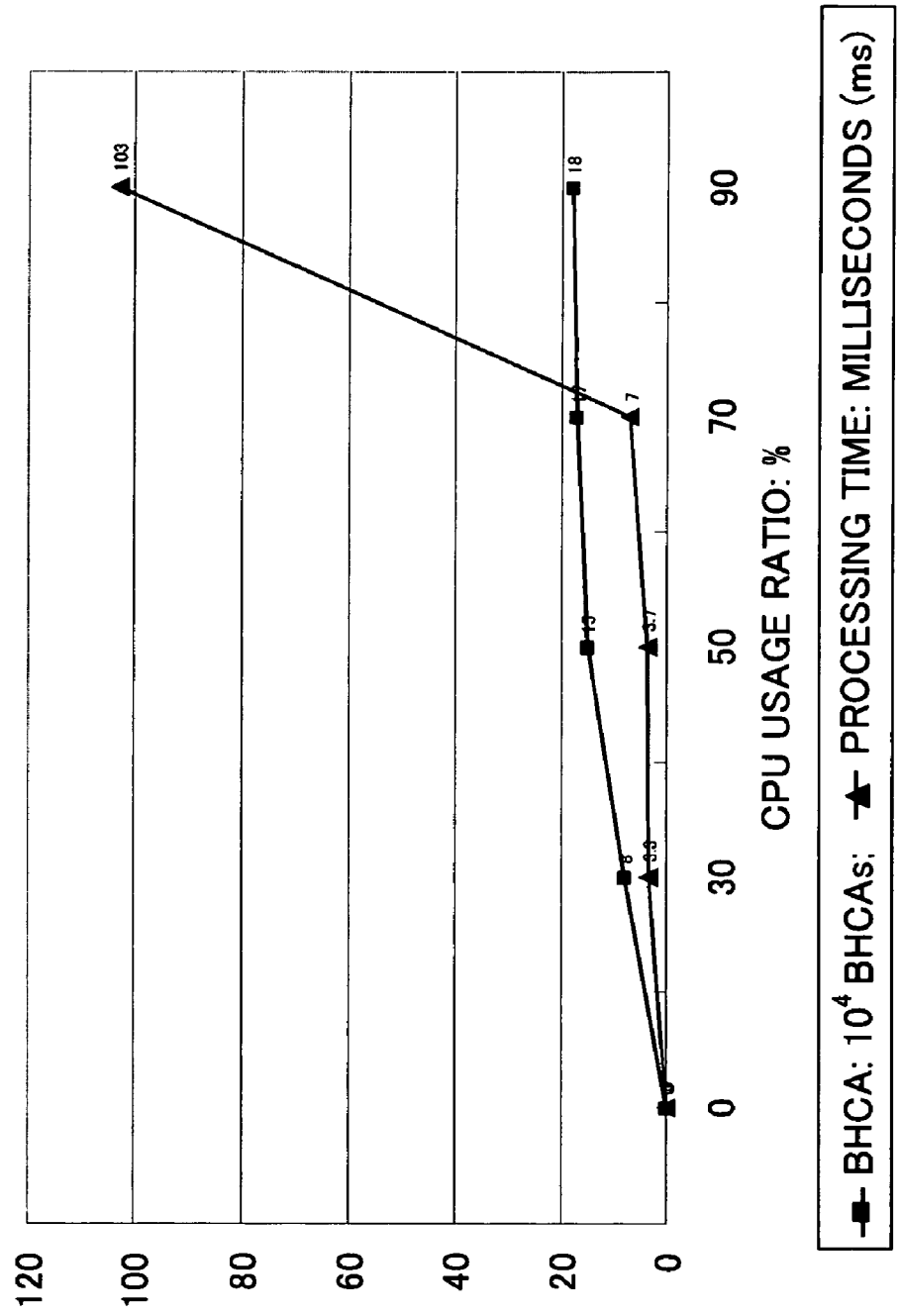
FIG. 2 shows a measurement example of an extension of a processing time for a call processing when a processing load is high.
Figure 13:
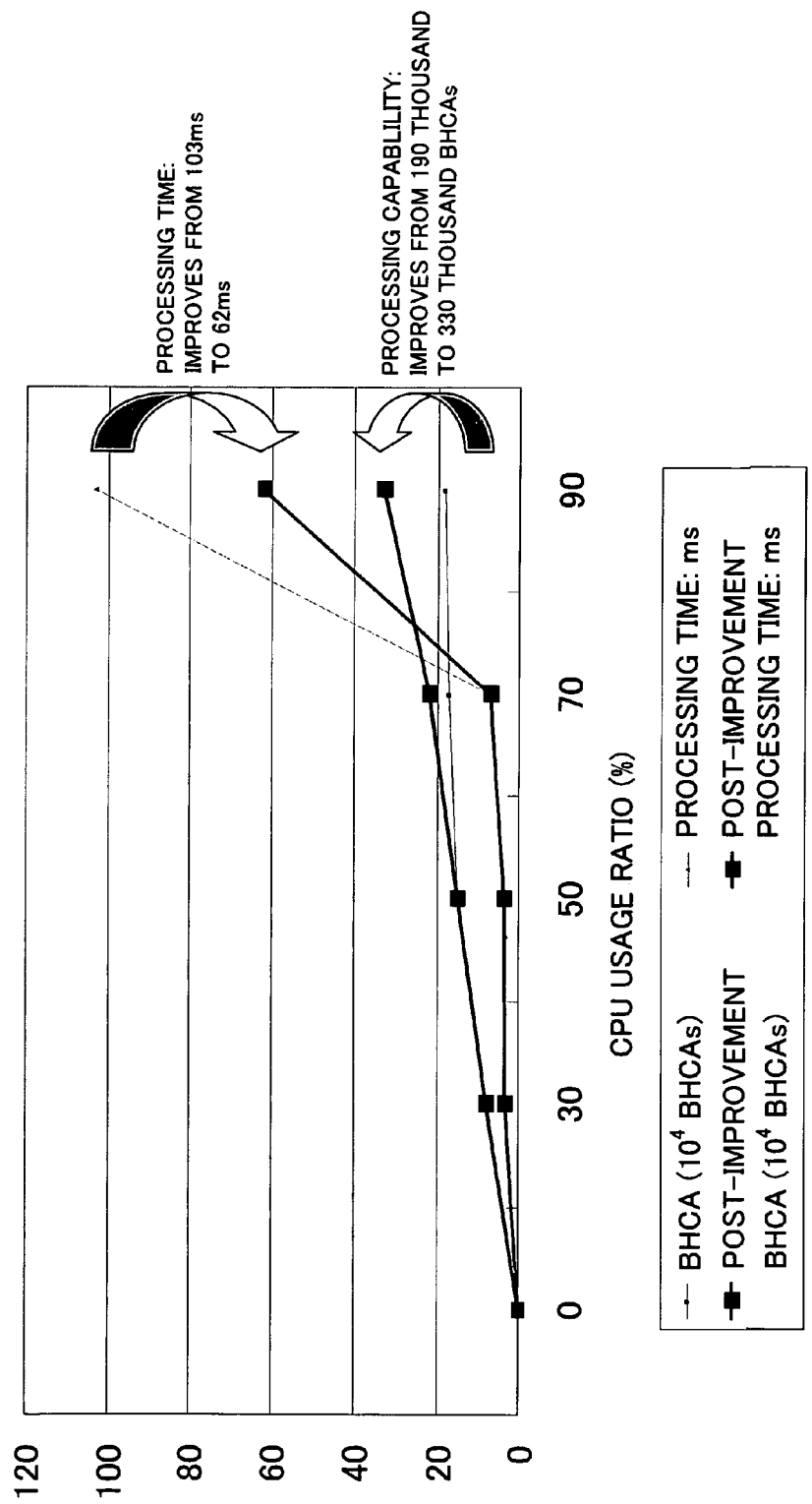
FIG. 13 shows an estimation example shown by FIG. 12 reflected to the measurement example shown by FIG. 2.

FIG. 13 shows an estimation example shown by FIG. 12B reflected to the measurement example shown by FIG. 2. As such, the telecommunication server according to the present embodiment makes it possible to provide an improved processing capability by approximately 60% when a load imposed on the CPU is high.

The next description deals with an example calculation of call processing capability in the case of increasing the number of CPUs of a computer system used for a telecommunication server while referring to FIGS. 14A and 14B which illustrates an estimation example of a call processing capability per CPU of a telecommunication server using a computer system comprising two CPUs. Note that the assumption here is that a transmission & receiving control processing requires a processing time of 0.5 ms per message and a call processing requires that of 2 ms, both carried out by the HA middleware. And, a control time in the case of carrying out an exclusive control for a call processing is 0.1 ms per the case, and two times of exclusive control are required for one CPU carrying out one call processing.

FIG. 14A shows the case of the conventional telecommunication server. In this case, the time for carrying out an exclusive control is 0.1 ms×2=0.2 ms. Therefore, an exclusive processing is actually carried out for a period of 0.2 ms×2=0.4 ms during a processing for one call processing message in a computer system with two CPUs which carries out call processings in parallel. Here, assuming that forty (40) call processing messages are processed in a processing time of 100 ms (which is convertible to 200 thousand BHCAs when converted to the unit of BHCA) per one CPU for example as an example of processing capability of the conventional telecommunication server, the ratio of waiting time for an exclusive control processing results in 0.4×40/100 ms=16%.

On the other hand, FIG. 14B shows the case of a telecommunication server according to the embodiment of the present invention. In this case, a buffering processing and merge processing, as new processing, are carried out for a call processing message. Note that the assumption is that forty call processing messages are processed by a new processing in a lump also in this case and the processing time for the new processing requires 0.5 ms as in the case of FIG. 12B.

In this case, the time required for forty call processing messages in a lump by one CPU is 62 ms as described for FIG. 12B. During this processing, the time for carrying out an exclusive processing is only 0.1 ms×2=0.2 ms. Therefore, in a computer system with two CPUs for carrying out call processing in parallel, an exclusive control is carried out for a period of 0.2 ms×2=0.4 ms during the processing for these call processing messages. If the time for the exclusive processing is converted to a processing time per 100 ms, that is, to a processing capability of 330 thousand BHCAs per one CPU as described for FIG. 12B, becomes 0.4 ms/64 ms×100 ms≈0.6 ms, hence the ratio of time for waiting for processing due to an exclusive control becomes 0.6 ms/100 ms=0.6%.

Figure 5:
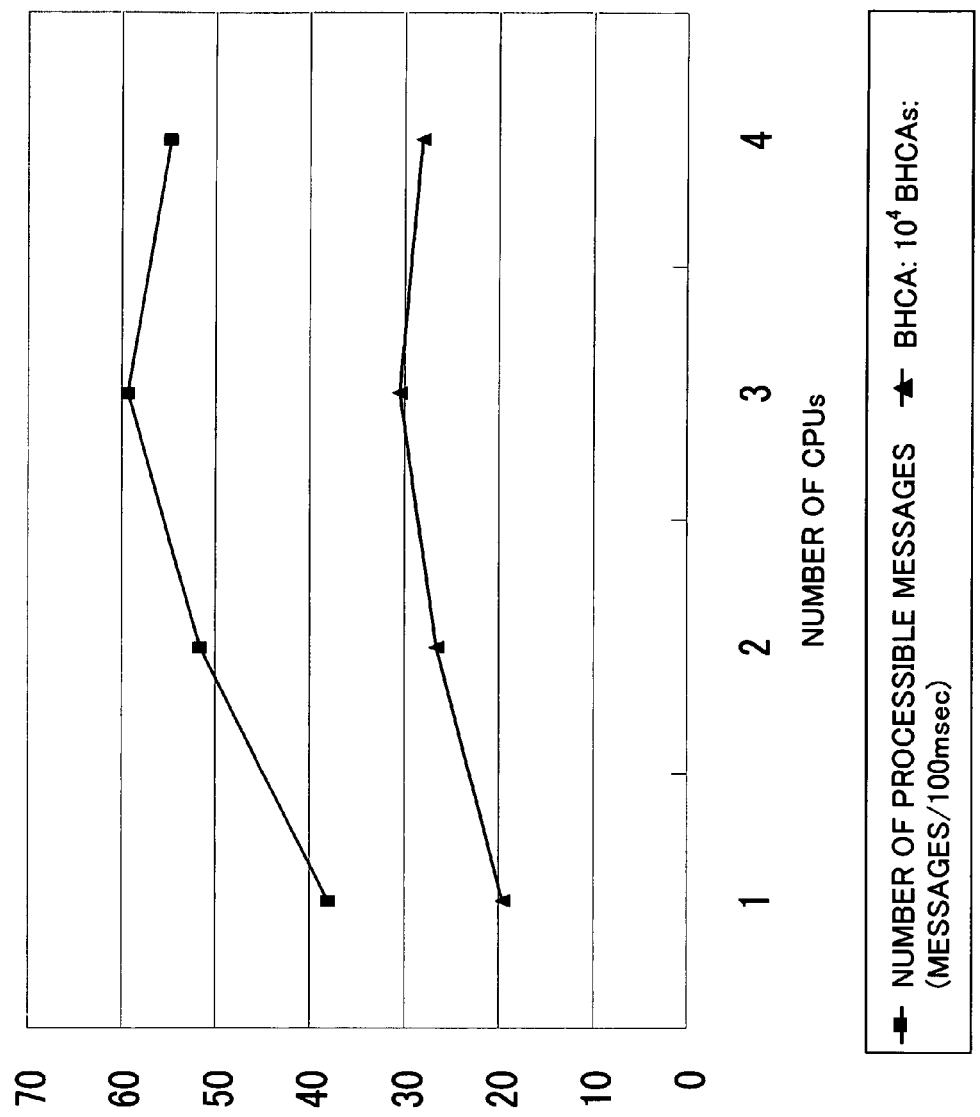
FIG. 5 shows a measurement example of a relationship between the number of CPUs in a computer system used as a telecommunication server and the number of processing call processings.
Figure 15:
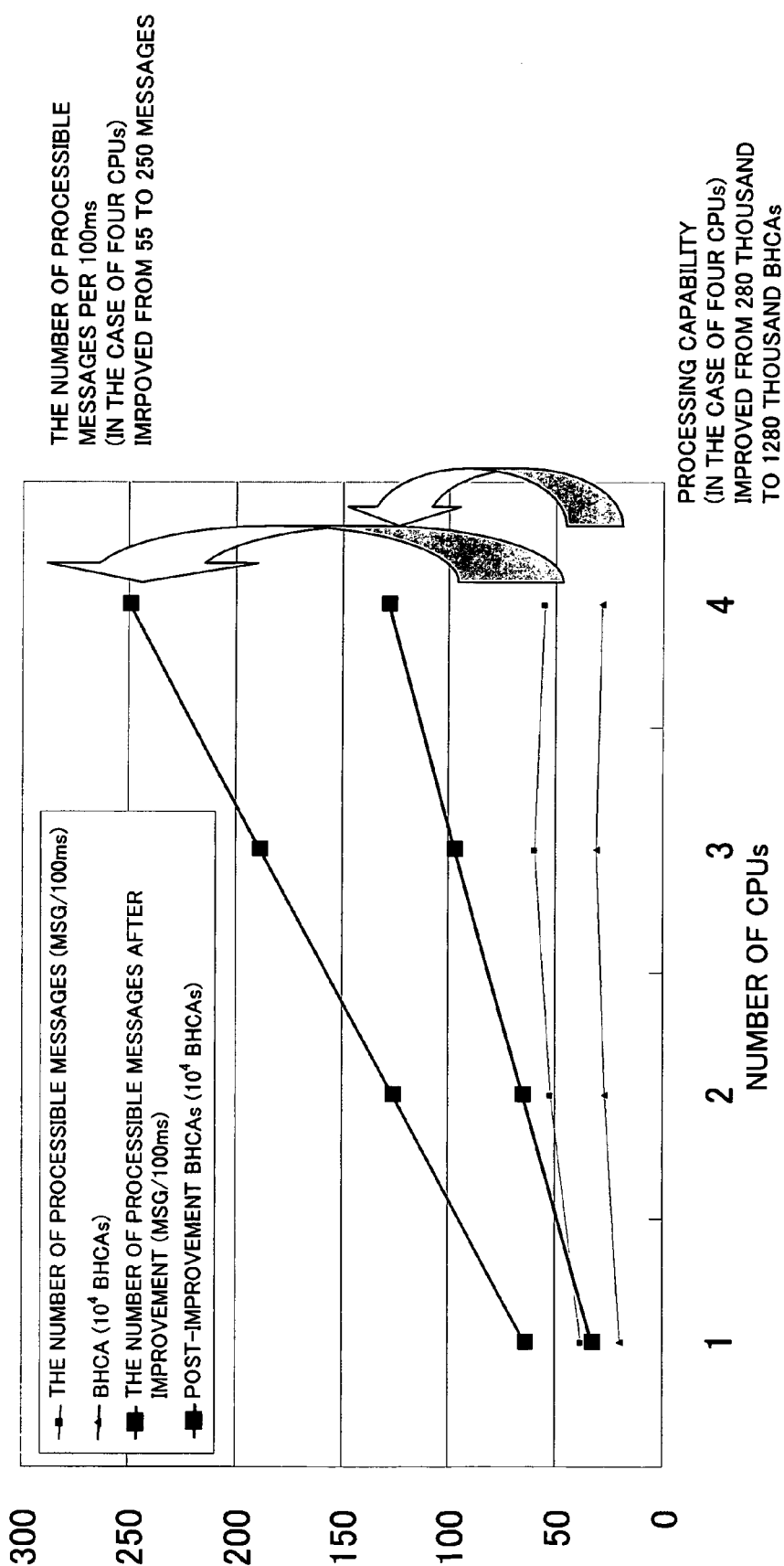
FIG. 15 shows an estimation example shown by FIG. 14B reflected to the measurement example shown by FIG. 5.

As described above, the present embodiment reduces the time for waiting for a processing due to an exclusive control, hence effectively reflecting an improvement of process capability by an increased number of CPUs in the case of comprising a telecommunication server by using a computer system with a multiple CPU. FIG. 15 shows the example calculation shown by FIG. 14B reflected to the example measurement shown by FIG. 5. As such, the present embodiment reduces an influence of stopping execution of other processing due to an exclusive control, resulting in solving a saturated increase in the number of processing when increasing the number of CPUs for a computer system as it is evident in the conventional technique, thus making it possible to expect an improved processing performance proportionate with the number of CPU in the computer system.

Note that the above described embodiment may also be configured to let a computer readable storage medium store various programs and let the CPU unit 51 read the aforementioned program out of the storage medium to execute instead of letting the CPU unit 51 read the program stored in advance by the storage unit 54 which is comprised by a computer system shown by FIG. 9 in order to make the computer system accomplish a control processing shown by FIG. 10.

FIG. 16 shows an example of a storage medium allowing a computer to read a stored program. As shown by FIG. 16, the storage medium can utilize for example a portable storage medium 63 such as a flexible disk, MO, CD-ROM, DVD-ROM, et cetera, in addition to a memory 62 such as a RAM, ROM or hard disk apparatus which are built in or comprised as an external accessory apparatus for a computer 61.

The storage medium may also be a storage apparatus 66 comprised by a computer functioning as program server 65 which is connected with the computer 61 by way of a telecommunication line 64. In this case, the configuration is for transmitting a transmission signal obtained by modulating a carrier wave by a data signal expressing a program from the program server 65 by way of the telecommunication line 64 that is a transmission medium so that the computer 61 demodulates the received signal to reproduce the program, thereby becoming capable of executing the aforementioned program.

Note that the present invention allows various improvements and/or changes within the scope of the present invention instead of being limited by the above described embodiment.

What is claimed is:

1. A telecommunication server apparatus for providing a telecommunication exchange function, comprising:
   a storage unit to manage a receiving order by storing a received call processing message;
   a retention unit to retain key information, which is included in the call processing message, and element information, which is correlated to the key information and included in the call processing message, by updating the two pieces of information for every key information at every time when receiving the call processing message; and
   a call processing execution unit to merge each call processing message stored by the storage unit and to carry out a call processing for the merged call processing message at a predetermined time interval in a lump based on the key information and element information stored by the retention unit.

2. The telecommunication server apparatus according to claim 1, wherein
   said key information is information for indicating a transmitter of a call processing message which has included the key information, and
   said element information is information for indicating a state of the transmitter.

3. The telecommunication server apparatus according to claim 1, further comprising:
   a judgment unit to judge a size of a load for providing a telecommunication exchange function by the telecommunication server apparatus, wherein
   said call processing execution unit carries out said call processing in a lump at a predetermined time interval if the judgment unit judges that a load for providing the telecommunication exchange function is large, while carrying out a call processing for a call processing message immediately at every time when the call message is received if the judgment unit judges the load is small.

4. The telecommunication server apparatus according to claim 3, wherein
   said judgment unit judges a size of a load of said processing based on a usage ratio of a processing apparatus which functions as said call processing execution unit.

5. A method for telecommunication exchange comprising:
   managing a receiving order by storing a received call processing message in a storage unit;
   retaining, in a retention unit, key information, which is included in the call processing message, and element information, which is correlated to the key information and included in the call processing message, by updating the two pieces of information for every key information at every time when receiving the call processing message; and
   merging each call processing message stored by the storage unit and carrying out a call processing for the merged call processing message at a predetermined time interval in a lump based on the key information and element information stored by the retention unit.

6. The method according to claim 5, wherein
   said key information is information for indicating a transmitter of a call processing message which has included the key information, and
   said element information is information for indicating a state of the transmitter.

7. The method according to claim 5, further comprising the steps of:
   judging a size of a load for providing a telecommunication exchange function, wherein
   said call processing is carried out in a lump at a predetermined time interval if a load for providing the telecommunication exchange function is judged as being large, while a call processing for a call processing message is carried out immediately at every time when the call message is received if the load is judged as being small, in carrying out said call processing.

8. The method according to claim 7, wherein
   said size of a load for providing said telecommunication exchange function is judged by a usage ratio of a processing apparatus which carries out said call processing.

9. A storage medium for storing a program for making a computer provide a telecommunication exchange function and allowing the computer read the program, wherein the program makes the computer carry out the processings of:
   managing a receiving order by storing a received call processing message in a storage unit;
   retaining, in a retention unit, key information, which is included in the call processing message, and element information, which is correlated to the key information and included in the call processing message, by updating the two pieces of information for every key information at every time when receiving the call processing message; and
   merging each call processing message stored by the storage unit and carrying out a call processing for the merged call processing message at a predetermined time interval in a lump based on the key information and element information stored by the retention unit.

10. The storage medium according to claim 9, wherein
    said key information is information for indicating a transmitter of a call processing message which has included the aforementioned key information, and
    said element information is information for indicating a state of the transmitter.

11. The storage medium according to claim 9, wherein
    said program further makes said computer carry out the processing of judging a size of a load for providing a telecommunication exchange function, wherein said call processing is carried out in a lump at a predetermined time interval if a load for providing the telecommunication exchange function is judged as being large, while a call processing for a call processing message is carried out immediately at every time when the call message is received if the load is judged as being small, in the processing of carrying out said call processing.

12. The storage medium according to claim 11, wherein said size of a load for providing said telecommunication exchange function is judged by a usage ratio of a processing apparatus which carries out said call processing.

* * * * *